(12) United States Patent
Wang

(10) Patent No.: US 7,082,958 B2
(45) Date of Patent: Aug. 1, 2006

(54) AIR VALVE FOR INFLATABLE BLADDER

(76) Inventor: Swei Mu Wang, P. O. Box 63-99, Taichung (TW) 406

( * ) Notice: Subject to any disclaimer, the term of this patent is extended or adjusted under 35 U.S.C. 154(b) by 305 days.

(21) Appl. No.: 10/778,364

(22) Filed: Feb. 10, 2004

(65) Prior Publication Data

US 2005/0173000 A1   Aug. 11, 2005

(51) Int. Cl.
*F16K 15/20* (2006.01)
(52) U.S. Cl. .................. 137/223; 137/843; 137/512; 251/149.1
(58) Field of Classification Search .......... 137/223, 137/512, 843; 251/149.1
See application file for complete search history.

(56) References Cited

U.S. PATENT DOCUMENTS

| | | | | |
|---|---|---|---|---|
| 2,024,780 A | * | 12/1935 | Ruckman | 137/225 |
| 2,162,603 A | * | 6/1939 | Bothe | 137/234 |
| 3,204,959 A | * | 9/1965 | Nicholls | 473/610 |
| 4,146,070 A | * | 3/1979 | Angarola et al. | 141/68 |
| 5,294,112 A | | 3/1994 | Smith | 273/58 BA |
| 5,358,001 A | | 10/1994 | Smith | 137/223 |
| 5,915,407 A | * | 6/1999 | West | 137/223 |
| 6,357,468 B1 | * | 3/2002 | Roussel | 137/223 |

* cited by examiner

Primary Examiner—Eric Keasel
Assistant Examiner—Craig Schneider
(74) Attorney, Agent, or Firm—Charles E. Baxley

(57) ABSTRACT

An air valve includes a valve member for attaching to a bladder, and having a bore, and a greater space communicating with the bore for receiving a plug. The plug includes a needle passage to receive an air inflating needle. A protective bonnet is engaged onto the valve member and includes an outer wall member having one or more openings to allow air to flow into and out of the bladder. The protective bonnet has a flexible bottom panel capable of blocking the valve member by the pressurized air in the bladder. The wall member of the protective bonnet is bellows-shaped formed by one or more peripheral bulges and one or more peripheral recesses.

10 Claims, 3 Drawing Sheets

AIR VALVE FOR INFLATABLE BLADDER

BACKGROUND OF THE INVENTION

1. Field of the Invention

The present invention relates to an air valve, and more particularly to an air valve having an air passage solidly blocking structure.

2. Description of the Prior Art

Various kinds of typical air valves have been developed for inflating air bladders, sports balls, or the like, and comprise a plug made of compressible material and having a needle passageway arranged for allowing a needle to pass through it and to expand towards itself to completely close when the needle is removed from the plug, and to ensure that pressurized air within the bladder cannot escape through the air valve.

For example, U.S. Pat. No. 5,294,112 to Smith discloses one of the typical air valves for inflating sports balls or the like. However, the plug which is made of compressible material may become failure after use. In addition, the air valve has no protective structure to absorb a force from the inflating needle.

U.S. Pat. No. 5,358,001 to Smith discloses another typical air valve including a protective bonnet permanently positioned within the bladder or the sports ball, and made of a rigid or semi-rigid plastic material to absorb the force from the inflating needle.

However, the protective bonnet is spaced away from the needle passageway of the plug, and may not be used to block the needle passageway of the plug when the plug has become failure after use.

The present invention has arisen to mitigate and/or obviate the afore-described disadvantages of the conventional air valves.

SUMMARY OF THE INVENTION

The primary objective of the present invention is to provide an air valve for inflating bladders and including a structure arranged for allowing the air passage to be solidly blocked upon removal of the needle, and to ensure that pressurized air within the bladder cannot escape through the air valve.

In accordance with one aspect of the invention, there is provided an air valve for attaching to a bladder, the air valve comprising a valve member for attaching to the bladder, the valve member including a bore formed therein, and a space formed therein and communicating with the bore thereof and having an inner diameter greater than that of the bore thereof, a plug received in the space of the valve member, and including a needle passage formed therein for receiving an air inflating needle and for supplying pressurized air into the bladder, and a protective bonnet engaged onto the valve member and including a chamber formed therein to receive the valve member. The protective bonnet includes an outer wall member having at least one opening formed therein, to allow air to flow through the opening of the protective bonnet and to flow into and out of the bladder, the protective bonnet includes a flexible bottom panel capable of blocking the valve member by the pressurized air in the bladder.

The valve member includes a peripheral sealing flange extended radially therefrom for attaching to the bladder. The protective bonnet includes a peripheral sealing flange extended radially therefrom for attaching to the peripheral sealing flange of the valve member.

The valve member includes an inner and inclined peripheral surface formed therein to facilitate an insertion of the plug into the space of the valve member. The valve member includes an inner and inclined peripheral surface formed in bottom of the space thereof, to engage with the plug and to retain the plug upwardly within the space of the valve member.

The plug includes an extension extended therefrom and engaged in the bore of the valve member. The extension of the plug is extended out of the valve member to engage with the flexible bottom panel of the protective bonnet when the flexible bottom panel of the protective bonnet is forced against the extension of the plug by the pressurized air in the bladder.

The plug includes a neck extended therefrom and engaged in the bore of the valve member. The plug includes a snap-in flange extended from the neck for engaging onto the bladder. The plug includes an inclined peripheral surface formed on top of the snap-in flange, to facilitate an insertion of the neck and the snap-in flange of the plug into the space of the valve member and outwardly through the bladder.

The outer wall member of the protective bonnet includes a bellows-shaped structure formed by at least one peripheral bulge and at least one peripheral recess, to allow the wall member to be extended and retracted.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
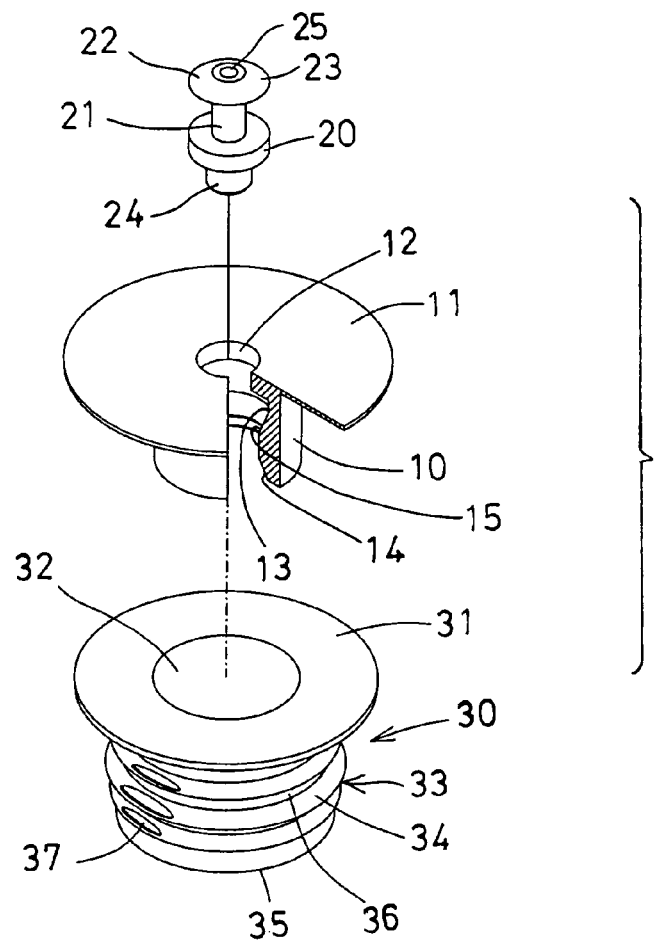
FIG. 1 is an exploded view of an air valve in accordance with the present invention.
Figure 2:
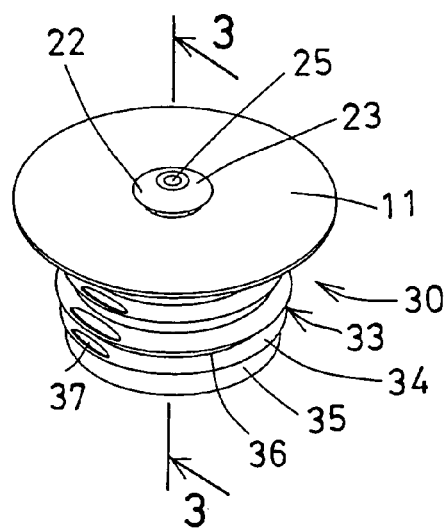
FIG. 2 is a perspective view of the air valve.
Figure 3:
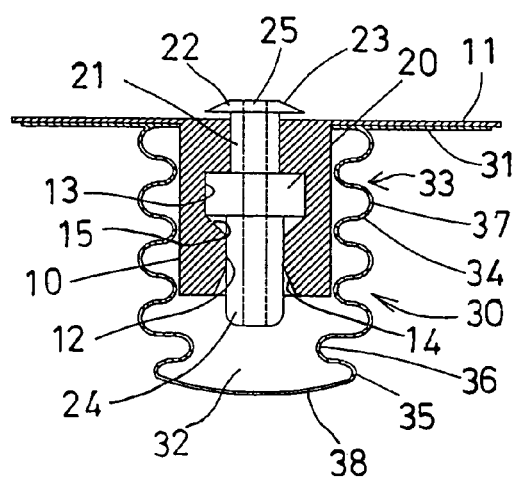
FIG. 3 is a cross sectional view taken along lines 3—3 of FIG. 2.

Referring to the drawings, and initially to FIGS. 1–3, an air valve in accordance with the present invention comprises a body or valve member 10 including a peripheral sealing flange 11 extended radially from one end, such as the upper end thereof, for attaching to the inner portion of a bladder 70 of a ball, such as a soccer ball, volleyball or the like, and thus for attaching the valve member 10 to the interior of the bladder 70.

The bladder 70 of the balls may be made from thermoplastic polyurethane elastomer materials, such as polyester-based or polyether-based polyurethane, polyvinyls, polyesters and polyethers, etc., which contribute a desired property, e.g. air retention, abrasion resistance, etc.

The valve member 10 includes a bore 12 formed therein, and a space 13 formed therein and communicating with the bore 12 thereof and having an inner diameter greater than that of the bore 12 thereof, for receiving an air sealing plug 20. It is preferable that the bore 12 of the valve member 10 includes a lower portion having a greater inner diameter than that of an upper portion thereof, for allowing the plug 20 to be engaged into the space 13 of the valve member 10.

It is preferable that the valve member 10 further includes an inner and inclined peripheral surface 14 formed in the lower portion thereof, for facilitating the insertion or the engagement of the plug 20 into the space 13 of the valve member 10. It is also preferable that the valve member 10 further includes an inner and inclined peripheral surface 15 formed in the lower portion of the space 13 thereof.

The plug 20 is made of compressible material and is dimensioned to fit into the space 13 of the valve member 10, and makes compression contact with the valve member 10. The inner and inclined peripheral surface 15 of the valve member 10 is arranged to engage with the plug 20 and to force the plug 20 to move toward the upper portion of the space 13 of the valve member 10, and for allowing the plug 20 to be slightly deformed or moved downwardly toward the lower portion of the space 13 of the valve member 10.

Figure 5:
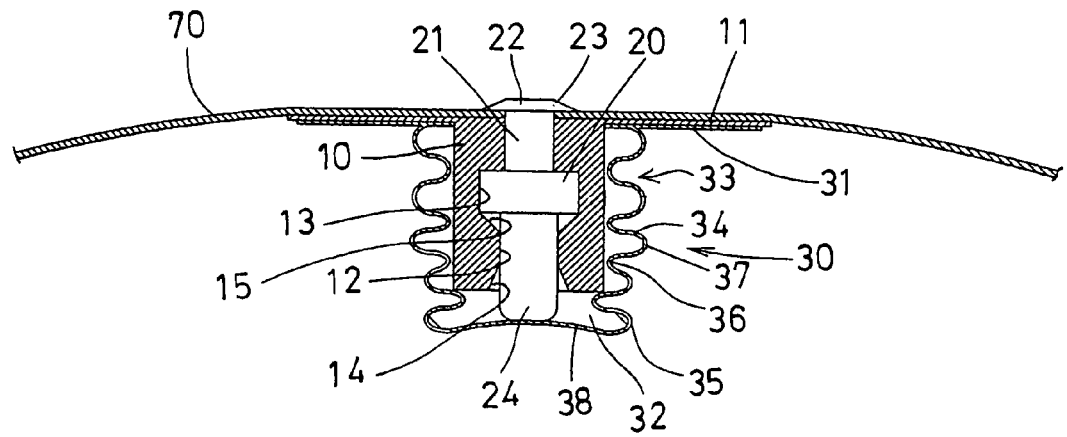
FIGS. 4, 5 are cross sectional views similar to FIG. 3, illustrating the operation of the air valve.
Figure 4:
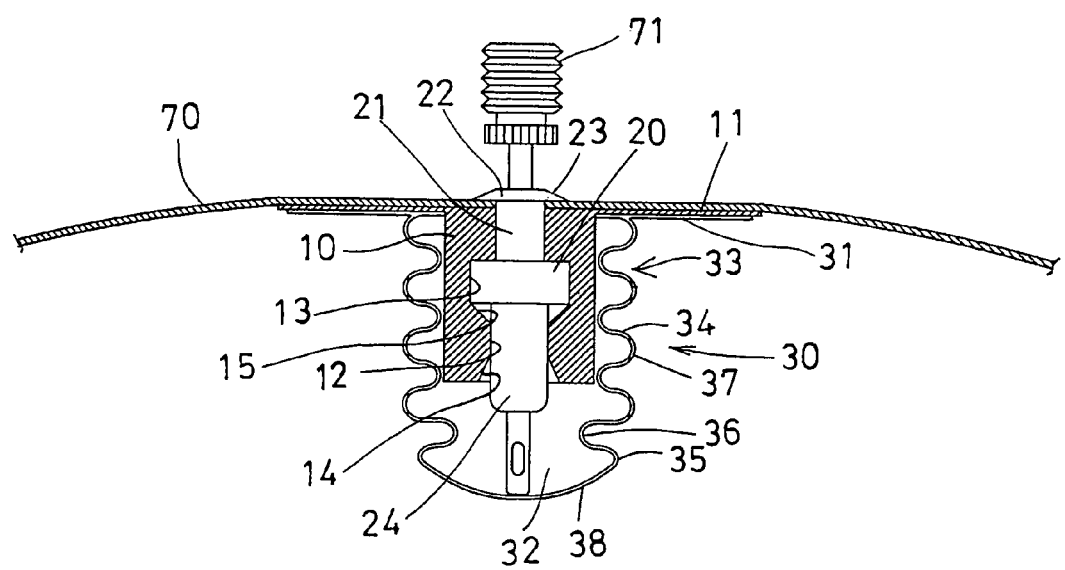

The plug 20 includes a neck 21 extended upwardly therefrom to engage and to fit into the upper portion of the bore 12 of the valve member 10, and an extension 24 extended downwardly therefrom to engage and to fit into the lower portion of the bore 12 of the valve member 10, and includes a snap-in flange 22 extended or provided on top of the neck 21 for engaging onto the outer peripheral portion of the bladder 70 (FIGS. 4, 5).

It is preferable that the plug 20 includes an outer and inclined peripheral surface 23 formed on top of the snap-in flange 22, for facilitating the insertion or the engagement of the neck 21 and the snap-in flange 22 into the space 13 of the valve member 10, and outwardly through the bladder 70. The plug 20 includes a needle passage 25 formed therein and extending through the neck 21 and the extension 24 thereof for receiving a needle 71 (FIG. 4).

The needle passage 25 of the compressible plug 20 is dimensioned for allowing the needle 71 to pass through it, and arranged to have the passage wall to expand toward itself to completely close upon removal of the needle 71, and to form an air-tight seal within the needle passage 25 of the compressible plug 20, and thus to ensure that pressurized air within the bladder 70 cannot escape through the valve member 10.

A protective bonnet 30 may further be provided and includes a peripheral sealing flange 31 extended radially from one end, such as the upper end thereof, for attaching to the inner portion of the bladder 70, or to the inner portion of the peripheral sealing flange 11 of the valve member 10. The protective bonnet 30 includes a chamber 32 formed therein for receiving the valve member 10.

The protective bonnet 30 includes a resilient or flexible outer wall member 33 having such as a bellows-shaped structure formed or defined by one or more peripheral bulges 34, 35 and one or more peripheral recesses 36, to allow the wall member 33 to be extended and retracted, and includes one or more openings 37 formed therein, such as formed in the peripheral bulges 34 thereof, except the lowest peripheral bulge 35 (FIGS. 1, 6), for allowing air to flow through the openings 37 of the protective bonnet 30 and to flow into and out of the bladder 70.

The protective bonnet 30 further includes a resilient or flexible bottom panel 38 capable of blocking the needle passage 25 of the plug 20 (FIG. 5). It is preferable that the extension 24 of the plug 20 extends downwardly and outwardly beyond the valve member 10, for allowing the bottom panel 38 of the protective bonnet 30 to block the needle passage 25 of the plug 20 (FIG. 5). However, the bottom panel 38 of the protective bonnet 30 may also be used to block the bore 12 of the valve member 10 when the extension 24 of the plug 20 do not extend out of the valve member 10.

In operation, as shown in FIG. 4, the needle 71 is engageable through the needle passage 25 of the plug 20 for inflating the bladder 70. The bottom panel 38 of the protective bonnet 30 may also be used to engage with the needle 71 and to absorb the force from the needle 71, and to prevent the bladder 70 and the snap-in flange 22 of the plug 20 from absorbing that force.

After the bladder 70 has been inflated and when the needle 71 has been disengaged from the needle passage 25 of the plug 20, as shown in FIG. 5, the pressurized air in the bladder 70 may force the bottom panel 38 of the protective bonnet 30 to engage with the extension 24 of the plug 20 and thus to block the needle passage 25 of the plug 20.

Similarly, the bottom panel 38 of the protective bonnet 30 may also be forced by the pressurized air in the bladder 70 to engage with the valve member 10 and thus to block the bore 12 of the valve member 10 when the extension 24 of the plug 20 do not extend out of the valve member 10. It is preferable that the lowest peripheral bulge 35 of the protective bonnet 30 do not have any openings 37 formed therein to ensure the bottom panel 38 of the protective bonnet 30 to seal the valve member 10.

Figure 6:
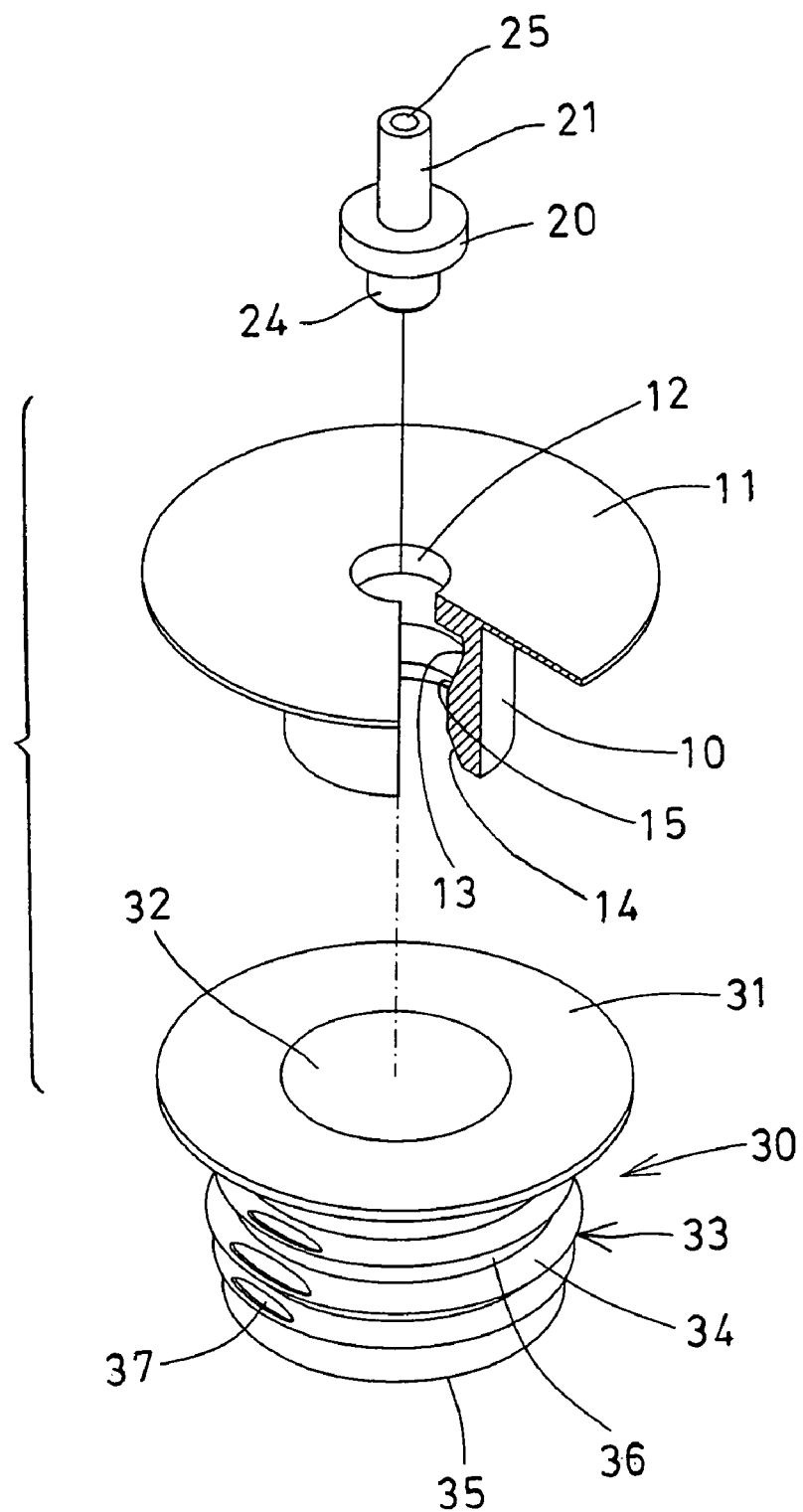
FIG. 6 is an exploded view similar to FIG. 1, illustrating the other arrangement of the air valve.

As shown in FIG. 6, the plug 20 may have no snap-in flange 22 extended or provided on the neck 21, when the valve member 10 is attached to the bladder 70 of American footballs or rugby balls or the like.

Accordingly, the air valve in accordance with the present invention includes a structure arranged for allowing the air passage to be solidly blocked upon removal of the needle, and to ensure that pressurized air within the bladder cannot escape through the air valve.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I Claim:

1. An air valve for attaching to a bladder, said air valve comprising:

a valve member for attaching to the bladder, said valve member including a bore formed therein, and a space formed therein and communicating with said bore thereof and having an inner diameter greater than that of said bore thereof, a plug received in said space of said valve member, and including a needle passage formed therein for receiving an air inflating needle and for supplying pressurized air into the bladder, and a protective bonnet engaged onto said valve member and including a chamber formed therein to receive said valve member, said protective bonnet including an outer wall member having at least one opening formed therein, to allow air to flow through said at least one opening of said protective bonnet and to flow into and out of the bladder, said protective bonnet including a flexible bottom panel capable of blocking said valve member by the pressurized air in the bladder, and said outer wall member of said protective bonnet including a bellows-shaped structure formed by at least one peripheral bulge and at least one peripheral recess, to allow said wall member to be extended and retracted.

2. The air valve as claimed in claim 1, wherein said valve member includes a peripheral sealing flange extended radially therefrom for attaching to the bladder.

3. The air valve as claimed in claim 1, wherein said valve member includes an inner and inclined peripheral surface formed therein to facilitate an insertion of said plug into said space of said valve member.

4. The air valve as claimed in claim 1, wherein said plug includes an extension extended therefrom and engaged in said bore of said valve member.

5. An air valve for attaching to a bladder, said air valve comprising:
- a valve member for attaching to the bladder, said valve member including a bore formed therein, and a space formed therein and communicating with said bore thereof and having an inner diameter greater than that of said bore thereof, said valve member including a peripheral sealing flange extended radially therefrom for attaching to the bladder,
- a plug received in said space of said valve member, and including a needle passage formed therein for receiving an air inflating needle and for supplying pressurized air into the bladder, and
- a protective bonnet engaged onto said valve member and including a chamber formed therein to receive said valve member, said protective bonnet including an outer wall member having at least one opening formed therein, to allow air to flow through said at least one opening of said protective bonnet and to flow into and out of the bladder, said protective bonnet including a flexible bottom panel capable of blocking said valve member by the pressurized air in the bladder, and said protective bonnet including a peripheral sealing flange extended radially therefrom for attaching to said peripheral sealing flange of said valve member.

6. An air valve for attaching to a bladder, said air valve comprising:
- a valve member for attaching to the bladder, said valve member including a bore formed therein, and a space formed therein and communicating with said bore thereof and having an inner diameter greater than that of said bore thereof,
- a plug received in said space of said valve member, and including a needle passage formed therein for receiving an air inflating needle and for supplying pressurized air into the bladder, and
- a protective bonnet engaged onto said valve member and including a chamber formed therein to receive said valve member, said protective bonnet including an outer wall member having at least one opening formed therein, to allow air to flow through said at least one opening of said protective bonnet and to flow into and out of the bladder, said protective bonnet including a flexible bottom panel capable of blocking said valve member by the pressurized air in the bladder, and
- said valve member including an inner and inclined peripheral surface formed in bottom of said space thereof, to engage with said plug and to retain said plug upwardly within said space of said valve member.

7. An air valve for attaching to a bladder, said air valve comprising:
- a valve member for attaching to the bladder, said valve member including a bore formed therein, and a space formed therein and communicating with said bore thereof and having an inner diameter greater than that of said bore thereof,
- a plug received in said space of said valve member, and including a needle passage formed therein for receiving an air inflating needle and for supplying pressurized air into the bladder, said plug including an extension extended therefrom and engaged in said bore of said valve member, and
- a protective bonnet engaged onto said valve member and including a chamber formed therein to receive said valve member, said protective bonnet including an outer wall member having at least one opening formed therein, to allow air to flow through said at least one opening of said protective bonnet and to flow into and out of the bladder, said protective bonnet including a flexible bottom panel capable of blocking said valve member by the pressurized air in the bladder, and
- said extension of said plug being extended out of said valve member to engage with said flexible bottom panel of said protective bonnet when said flexible bottom panel of said protective bonnet is forced against said extension of said plug by the pressurized air in the bladder.

8. An air valve for attaching to a bladder, said air valve comprising:
- a valve member for attaching to the bladder, said valve member including a bore formed therein, and a space formed therein and communicating with said bore thereof and having an inner diameter greater than that of said bore thereof,
- a plug received in said space of said valve member, and including a needle passage formed therein for receiving an air inflating needle and for supplying pressurized air into the bladder, and
- a protective bonnet engaged onto said valve member and including a chamber formed therein to receive said valve member, said protective bonnet including an outer wall member having at least one opening formed therein, to allow air to flow through said at least one opening of said protective bonnet and to flow into and out of the bladder, said protective bonnet including a flexible bottom panel capable of blocking said valve member by the pressurized air in the bladder, and
- said plug including a neck extended therefrom and engaged in said bore of said valve member.

9. The air valve as claimed in claim 8, wherein said plug includes a snap-in flange extended from said neck for engaging onto the bladder.

10. The air valve as claimed in claim 9, wherein said plug includes an inclined peripheral surface formed on top of said snap-in flange, to facilitate an insertion of said neck and said snap-in flange of said plug into said space of said valve member and outwardly through the bladder.

* * * * *